US012792162B1

(12) United States Patent
Emmerich

(10) Patent No.: US 12,792,162 B1
(45) Date of Patent: Nov. 10, 2026

(54) SYSTEM AND METHOD FOR PROCESSING COMPUTER MOUSE DATA

(71) Applicant: Beau David William Emmerich, Port Orange, FL (US)

(72) Inventor: Beau David William Emmerich, Port Orange, FL (US)

( * ) Notice: Subject to any disclaimer, the term of this patent is extended or adjusted under 35 U.S.C. 154(b) by 0 days.

(21) Appl. No.: 19/533,290

(22) Filed: Feb. 9, 2026

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01)

(58) Field of Classification Search
CPC ................... G06F 3/033; G06F 3/0354; G06F 3/03543–03549; G06F 3/038–0383
See application file for complete search history.

(56) References Cited

U.S. PATENT DOCUMENTS 5,805,165 A * 9/1998 Thorne, III ............. G06F 3/038 715/823
6,252,579 B1 * 6/2001 Rosenberg .............. G06F 3/038 345/157
7,071,919 B2 * 7/2006 Hinckley .............. G06F 3/0362 345/163
7,564,446 B2 * 7/2009 Hinckley ............ G06F 3/03543 345/163
7,714,840 B2 * 5/2010 Hinckley ............ G06F 3/03543 345/163
10,430,017 B2 * 10/2019 Au ........................ G06F 3/0481

* cited by examiner

*Primary Examiner* — Gene W Lee
(74) *Attorney, Agent, or Firm* — Michael D. Eisenberg; MDE Patents

(57) ABSTRACT

A system for coordinated real-time processing of mouse data including a processor of a computer system node connected to a mouse and a memory on which are stored machine-readable instructions that when executed by the processor, cause the processor to: monitor X pixel count of a cursor position and apply predetermined target zone defining X coordinate range; determine if an X velocity threshold is reached; responsive to the X velocity threshold being reached, determine if the cursor position is within the predetermined target zone; responsive to the cursor position being within the predetermined target zone, start a countdown timer; detect a cursor stop within a set stop lock time period determined by the countdown timer; and activate a dead zone and custom functions of the mouse.

20 Claims, 5 Drawing Sheets

100

300

SYSTEM AND METHOD FOR PROCESSING COMPUTER MOUSE DATA

FIELD OF DISCLOSURE

The present disclosure generally relates to a computer mouse movement, and more particularly, to an automated system for coordinated real-time processing of computer mouse data and coordinated mouse movement that significantly reduces accidental triggers.

BACKGROUND

The process of using a computer mouse is very well known. The mouse moves in X and Y directions and collects the movement information via a laser sensor or an optical on the mouse, along with many other operations that happen within the device. When the mouse is moved in the Z direction (i.e., vertically lifted away from the mousepad/contact surface), the mouse cannot transmit effective cursor input information to the user laptop/desktop. This issue has been addressed, for example, by the U.S. Pat. No. 8,159,455 B2 which addresses the movements of the mouse when it is lifted off the contact surface. This Patent discloses a method and apparatus for processing combinations of force and velocity data generated over a given period of time. In one embodiment, an input device comprising one or more force sensors and one or more motion sensors is manipulated relative to a surface. A receiving system is adapted to receive input sequences or "gestures" which are triggered upon the occurrence of one or more conditions detected by the input device. An application executing in the receiving system may be implemented such that the system responds differently to each specific gesture provided by the user.

As another example, U.S. Pat. No. 8,159,457 B2 discloses a method for activating an application without specific positioning of a mouse or clicking a mouse button ("zero-click activation"). This is done by evaluating motion of an input device with regard to predetermined criteria; detecting a rapid, multi-directional motion (a shaking motion) of the input device, and initiating a preconfigured application in response thereto. In an embodiment, the input device is a mouse, and the method is performed without actuating a button on the mouse. The preconfigured application may be a search function, and in particular may be a Web search invoked when a shaking action is detected while the user is viewing a Web site.

However, these conventional systems produce excessive noise that cause accidental triggers that occur and the "user experience" is compromised. The conventional systems cannot be deployed at scale due to this oversight.

Accordingly, a computer-implemented system and method for real-time processing of computer mouse data and coordinated mouse movement that has minimal accidental triggers is desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for coordinated real-time processing of mouse data including a processor of a computer system node connected to a mouse and a memory on which are stored machine-readable instructions that when executed by the processor, cause the processor to: monitor X pixel count of a cursor position and apply predetermined target zone comprising X coordinate range; determine if an X velocity threshold is reached; responsive to the X velocity threshold being reached, determine if the cursor position is within the predetermined target zone; responsive to the cursor position being within the predetermined target zone, start a countdown timer; detect a cursor stop within a set stop lock time period determined by the countdown timer; and activate a dead zone and custom functions of the mouse.

Another embodiment of the present disclosure provides a method that includes one or more of: monitoring X pixel count of a cursor position and apply predetermined target zone comprising X coordinate range; determining if an X velocity threshold is reached; responsive to the X velocity threshold being reached, determining if the cursor position is within the predetermined target zone; responsive to the cursor position being within the predetermined target zone, starting a countdown timer; detecting a cursor stop within a set stop lock time period determined by the countdown timer; and activating a dead zone and custom functions of the mouse.

Another embodiment of the present disclosure provides a computer-readable medium including instructions for: monitoring X pixel count of a cursor position and apply predetermined target zone comprising X coordinate range; determining if an X velocity threshold is reached; responsive to the X velocity threshold being reached, determining if the cursor position is within the predetermined target zone; responsive to the cursor position being within the predetermined target zone, starting a countdown timer; detecting a cursor stop within a set stop lock time period determined by the countdown timer; and activating a dead zone and custom functions of the mouse.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
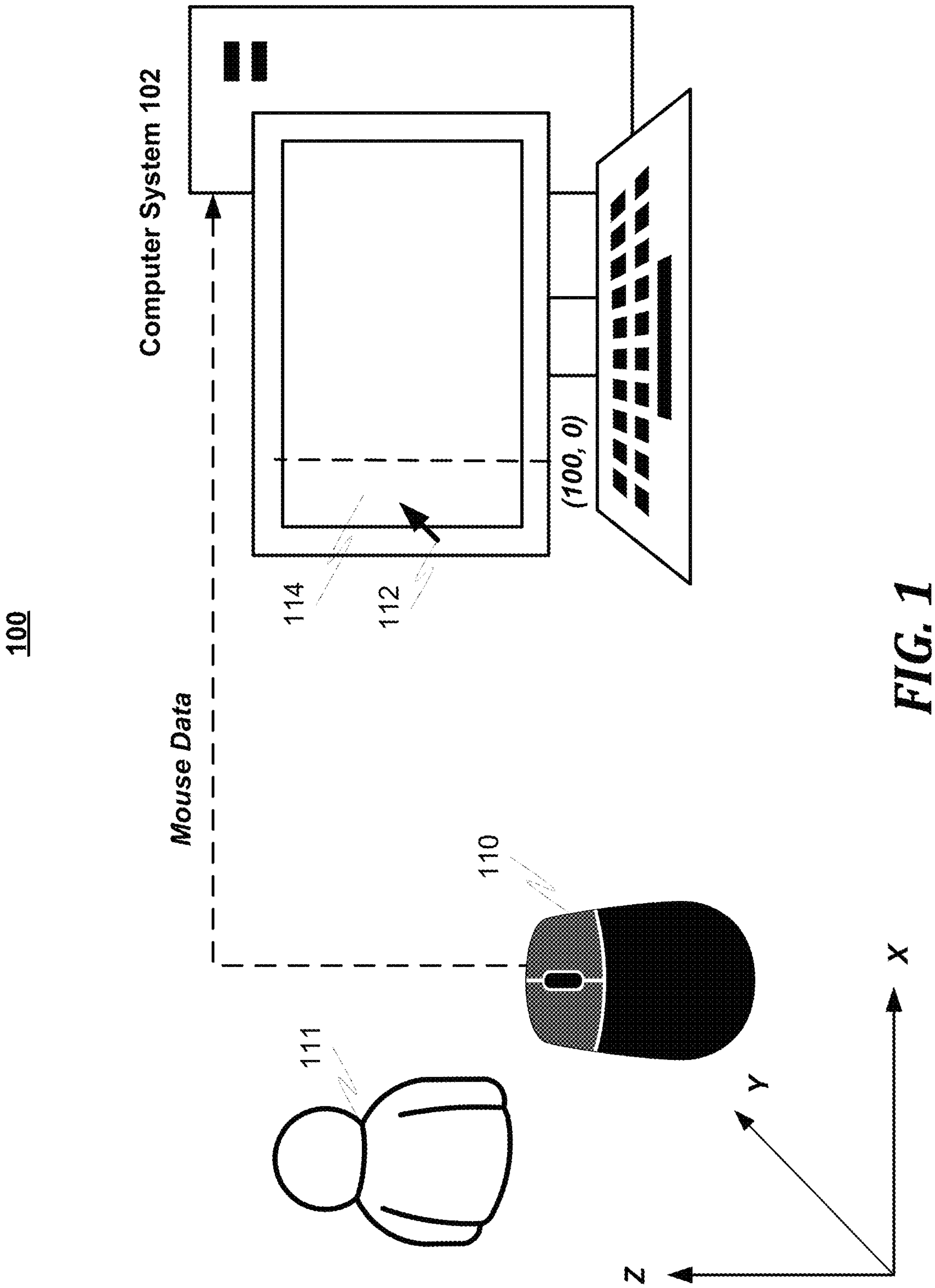
FIG. 1 illustrates a network diagram of a computer mouse that moves in vertical direction consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 34 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of automated system for coordinated real-time processing of computer mouse data, embodiments of the present disclosure are not limited to use only in this context.

The present disclosure provides a system, method and computer-readable medium for automated processing of computer mouse data.

FIG. 1 illustrates a network diagram of a system for coordinated disposition of privileged access across all identity control planes consistent with the present disclosure.

Referring to FIG. 1, the example network 100 includes the computer system node 102 connected to a mouse 110 operated by a user 111. The mouse 110 may move vertically (in Z plane) and these movements are detected and interpreted by the computer system node 102.

As discussed above in the background section, when the mouse 110 is moved in the Z direction (vertically lifted away from the mousepad/contact surface), the mouse 110 cannot transmit effective cursor 112 input information to the computer system 102. In one embodiment a synthetic lift off dead zone may be used. The computer system 102 employs a calculation where it takes in a rapid acceleration across the X or Y axis followed by a nearly dead stop of X or Y input. The dead stop is initiated by a voluntary lift-off procedure created by the user 111. The default mouse functions are regained by any X and Y inputs.

In one embodiment, a swipe-left execution where the cursor 112 must land on the far left of the screen—in a zone 114 (~100 pixels wide and the full height of the screen). This eliminates accidental activation while still maintaining a very comprehensible, easy-to-use, and effective activation method. The disclosed method eliminates/mitigates user or program error(s). Note that values place for X or even Y in order to partition the screen are explanatory and can be changed to accommodate for the desired target zone.

According to the preferred embodiments, Hot Corners remain a standard feature in operating systems (most notably MacOS) that allows users to trigger specific system actions by simply moving the mouse cursor into one of the four corners of the screen.

While "hot corners" exist, they typically trigger upon arrival. The disclosed "Triple-Lock" (Velocity Spike+Coordinate Boundary+Lock_time+Dead zone) creates a unique conditional sequence. Conventionally, preventing gesture noise is implemented by adding more sensors. The disclosed solution is based on adding spatial constraints and presents a novel algorithmic alternative. While Hot Corners solve accidental triggers by requiring a button press (modifier key), the disclosed program solves it through physics-detecting a specific velocity signature and a lift-off. While Hot Corners are used for "System Actions" (like locking the screen), the disclosed logic uses the boundary as a safety rail for "Device Control" (volume/brightness).

Unlike Hot Corners which are restricted to the four extreme corners, the disclosed method uses Zones (the entire left or right edge up to 100 px wide). This broader spatial awareness, combined with velocity, is a unique improvement of the Hot Corner concept.

The disclosed uni-directional inputs+partitioned target zones+stop_lock_time+dead zone solve the interpretation of mouse lift issues. The value thresholds that are implemented in the disclosed system are so difficult to replicate that the user 111 must lift the mouse 110 off in order to trigger these functions. The disclosed system has minimal accidental triggers and contains functions/algorithms that automatically prescribe thresholds dependent upon mouse DPI, screen size, and pixel count to make for a positive user experience even though there is a change in hardware. If all a user had to do was to swipe left+lift mouse off and then scroll for brightness and execute that same function to right for volume, with minimal to no accidental triggers—this would be a significant technical improvement.

In one embodiment, the system may require that the user is at the UI boundary (x<100 pixels) or (x>2500) via right swipe. The disclosed system sequence addresses a stop_locktime (a time of near 0.06 s where the lift_off must be done in a target zone. As discussed above, while "hot corners" exist, they typically trigger upon arrival. The disclosed "Triple-Lock" (Velocity Spike+Coordinate Boundary+Lock_time+Dead zone) creates a unique conditional sequence.

The disclosed method of processing mouse 110 data may include the following steps:

Step 1—Monitor pixel count and apply predetermined target zone (x=100);

Step 2—Predetermined X velocity is reached;

Step 3—Target zone is crossed by cursor and Timer is activated;

Step 4—Cursor Stop must occur in the target zone and before the timer runs out. If the timer runs out the program re-checks for X velocity. If the stop is not achieved in time the default mouse functions are activated. This allows for the user 111 to start from the target zone. This also helps for increased activation success significantly as the user can over exaggerate their flick_swipe (motion) and still be successful.

Step 5—If cursor stop achieved, then dead zone and custom functions are active;

Step 6—Dead zone threshold breaks upon X/Y input change and default functions restored.

Note that unless Custome_Gesture_Activated+Dead zone_activated parameter is reached (i.e., X is outside the Dead zone) the default mouse functions are active.

The disclosed algorithm requires the user 111 to flick the mouse 110 cursor 112 into the target zone 114 and lift before lateral motion is stopped. The unique motion allows for the user 111 to remember what he/she did to activate these "hot keys." The application utilizes standard pixel traversal measurements and cursor position to do all of this. No extra sensors are, advantageously, used or required.

The thresholds (Target_zones) and (Stop_lock_time), advantageously, make for a significant reduction in accidental triggers and allow for the activation of custom functions to be more easily accomplished. In the disclosed embodiments, it does not matter if the system uses X, Y or both. It does not really matter if the target zone is the top, left or right boundary. It does matter how large the dead zone (i.e., arbitrary size may be used) is and how short the time interval is and whether or not the algorithm loops back to check X velocity.

The key conditions that significantly reduce error and make the disclosed system novel are:

Target_zone;

Limited_activation_time when prior conditions are met:

- - - TUNING SETTINGS

SWIPE THRESHOLD=***

STOP DEAD ZONE=****

STOP LOCK_TIME=0.06 (for example)

ZONE_WIDTH PIXELS=****

In one embodiment, the time condition used to activate or maintain the dead zone and custom functions is implemented as a stop lock time window, during which a cursor stop must be detected in the target zone. In other embodiments, the system may employ a timer that counts upward from an event (for example, crossing the target zone or reaching the X velocity threshold) and is periodically reset, such that the processor repeatedly evaluates whether the X velocity, cursor position, and other predetermined values are satisfied before a maximum time interval elapses.

For example, the system may loop to re-check cursor velocity and position while a timer counts up, resetting the timer when the conditions are not met, thereby allowing successful activation for a variety of swipe lengths and swipe angles, including cases where the cursor reaches the screen boundary before the swipe ends. The implementation of this time-based logic, advantageously, mitigates accidental triggers with great effectiveness by requiring that the temporal and spatial conditions be satisfied together, while still accommodating different user swipe behaviors.

Figure 2:
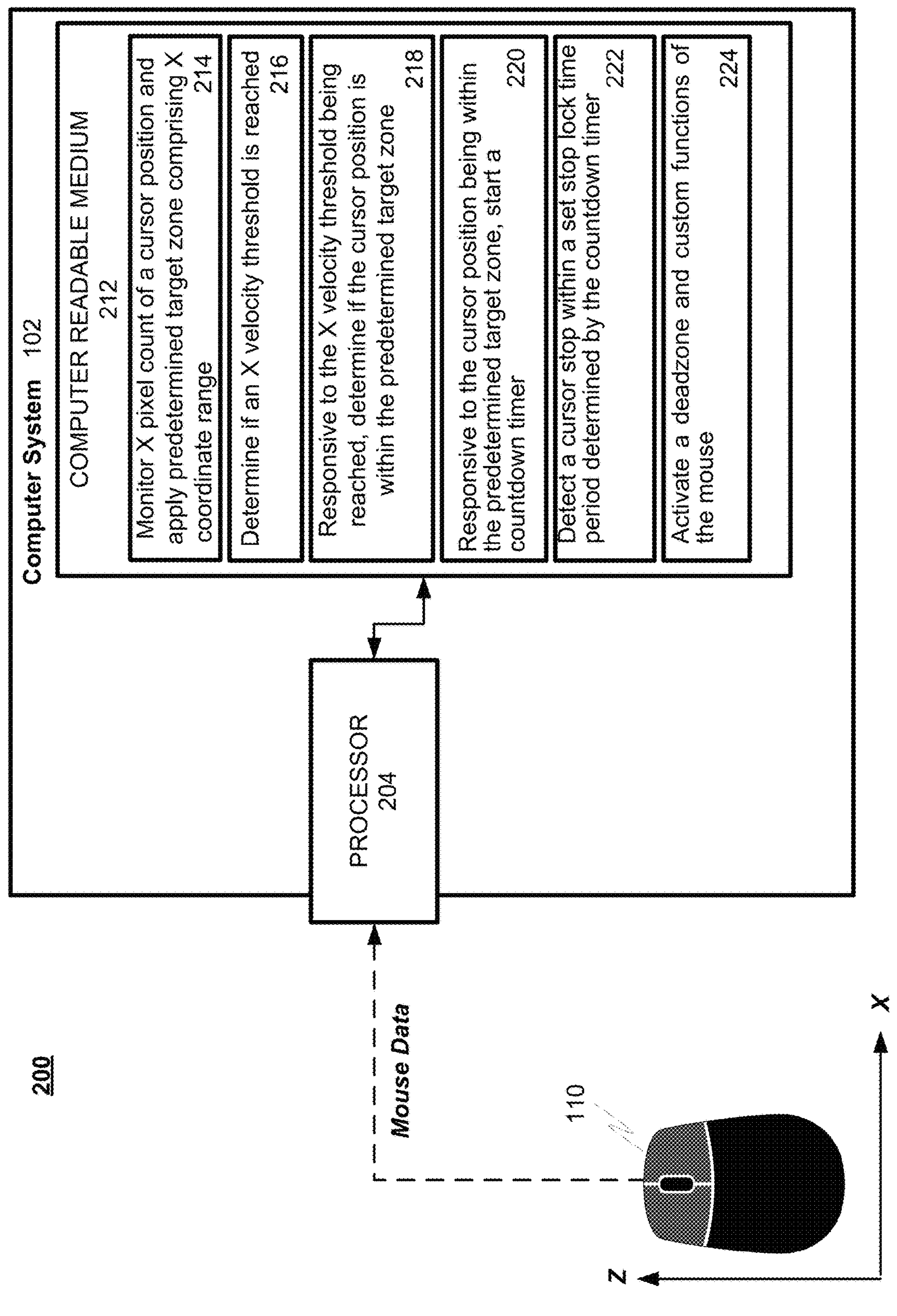
FIG. 2 illustrates a diagram of a system including detailed features of a computer system node connected to a mouse consistent with the present disclosure.

FIG. 2 illustrates a network diagram of a system including detailed features of a computer system node consistent with the present disclosure.

Referring to FIG. 2, the example network 200 includes the computer system node 102 connected to the mouse 110. The mouse 110 may move vertically (in Z plane) and these movements may be detected and interpreted by the computer system node 102.

As discussed above, when the mouse 110 is moved in the Z direction (vertically lifted away from the mousepad/contact surface), the mouse 110 cannot transmit effective cursor 112 input information to the computer system 102. In one embodiment a synthetic lift off dead zone may be used. The computer system 102 employs a calculation where it takes in a rapid acceleration across the X or Y axis followed by a nearly dead stop of X or Y input. The dead stop is initiated by a voluntary lift-off procedure created by the user 111. The default mouse functions are regained by any X and Y inputs.

The logic executed by the mouse interpretation application may be as follows:

Input Velocity (x) is reached+Target_zone+stop_time+dead zone;

Custom functions are activated; and

Deactivation occurs when one pixel of input occurs.

While this example describes in detail only one computer system node 102, multiple such nodes may be connected to the network. It should be understood that the computer system node 102 may include additional components and that some of the components described herein may be removed and/or modified without departing from a scope of the computer system node 102 disclosed herein. The computer system node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the computer system node 102 may include multiple processors, multiple cores, or the like, without departing from the scope of the BOS node 102 system.

The computer system node 102 may also include a non-transitory computer readable medium 212 that may have stored thereon machine-readable instructions executable by the processor 204. Examples of the machine-readable instructions are shown as 214-224 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to monitor X pixel count of a cursor position and apply predetermined target zone 114 comprising X coordinate range (see FIG. 1). The processor 204 may fetch, decode, and execute the machine-readable instructions 218 to determine if an X velocity threshold is reached. The processor 204 may fetch, decode, and execute the machine-readable instructions 220 to, responsive to the X velocity threshold being reached, determine if the cursor 114 position is within the predetermined target zone 114.

The processor 204 may fetch, decode, and execute the machine-readable instructions 222 to, responsive to the cursor position being within the predetermined target zone, start a countdown timer. The processor 204 may fetch, decode, and execute the machine-readable instructions 224 to detect a cursor stop within a set stop lock time period determined by the countdown timer. The processor 204 may fetch, decode, and execute the machine-readable instructions 226 to activate a dead zone and custom functions of the mouse 110.

Note that while X pixel count, X velocity, or an X-axis target zone are used in this example, the same approach can also be applied on the Y axis (or a mix of X and Y) for monitoring movement and defining target zones. The disclosed logic is not limited to just the X direction. It can encompass Y to address the top zone of the computer. Thus, velocities may involve Y direction.

In one embodiment, the processor may be further configured to apply a machine learning model to swipe history data to predict one or more of the X velocity threshold(s), stop lock time period, dead zone, or predetermined target zone for a user.

In some embodiments, one or more of the thresholds described herein (for example, X velocity threshold, stop lock time, dead zone size, and target zone width) are not fixed values. These values may be adaptively determined based on historical user interaction data. In these embodiments, the system may monitor and log user swipe histories, including cursor velocities, positions, and activation outcomes, and use that data to compute or update the thresholds over time to reduce accidental triggers and improve activation success.

In further embodiments, the system may employ a machine learning model based on a neural network, trained on swipe history data from one or more users to predict suitable thresholds for new or existing users. For example, the system may apply a machine learning model to prescribe initial thresholds for a new user and then refine those thresholds based on that user's subsequent swipe history.

Figure 3:
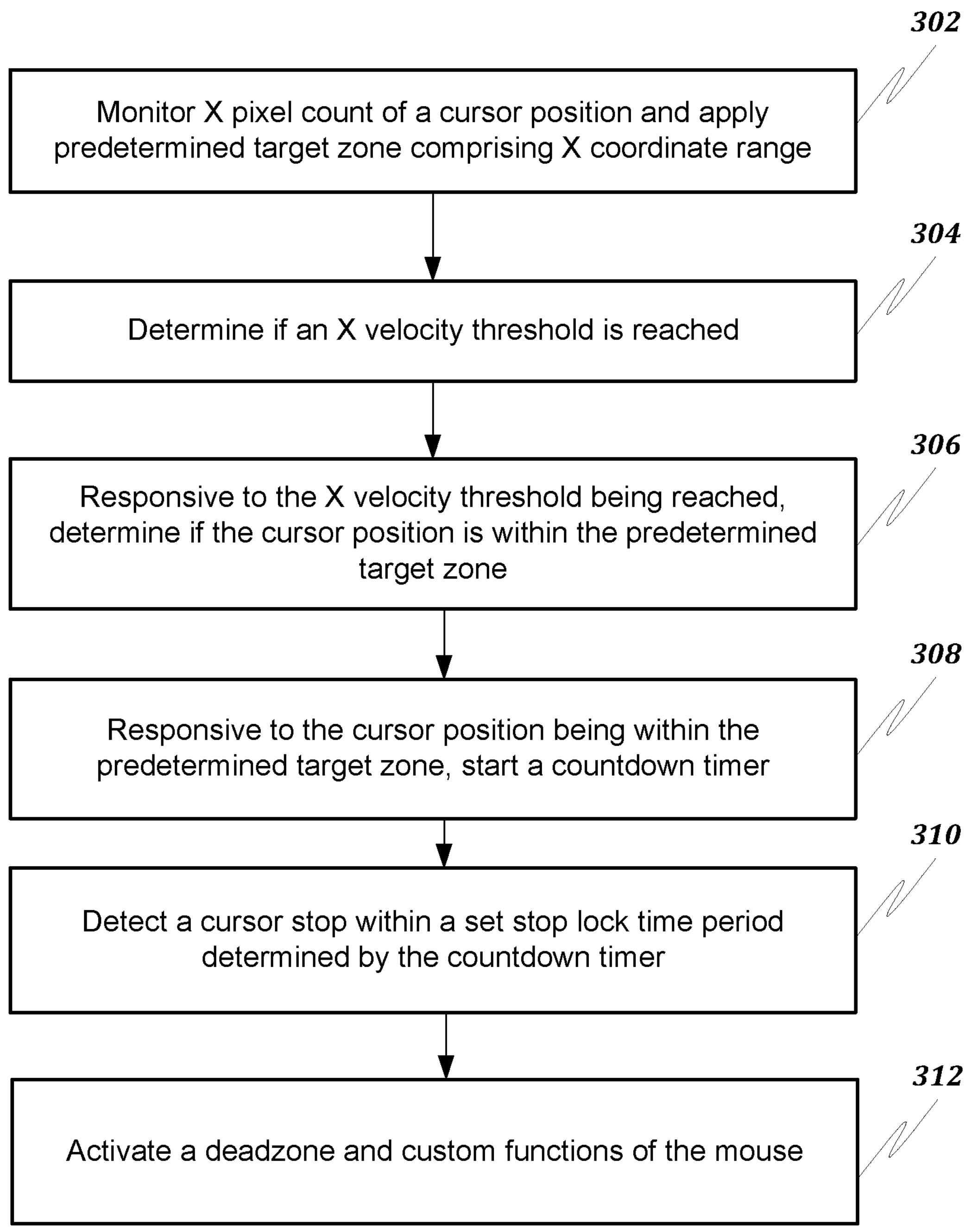
FIG. 3 illustrates a flowchart of a method for real-time processing of computer mouse data and coordinated mouse movement consistent with the present disclosure.

FIG. 3 illustrates a flowchart of a method for real-time processing of computer mouse data and coordinated mouse movement consistent with the present disclosure.

Referring to FIG. 3, the method 300 may include one or more of the steps described below. FIG. 3 illustrates a flow chart of an example method executed by the computer system 102 (see FIG. 2). It should be understood that method 300 depicted in FIG. 3 may include additional operations and that some of the operations described therein may be removed and/or modified without departing from the scope of the method 300. The description of the method 300 is also made with reference to the features depicted in FIG. 2 for purposes of illustration. Particularly, the processor 204 of the computer system node 102 may execute some or all of the operations included in the method 300.

With reference to FIG. 3, at block 302, the processor 204 may monitor X pixel count of a cursor position and apply a predetermined target zone comprising X coordinate range. Based on the control plans' data, at block 304, the processor 204 may determine if an X velocity threshold is reached. At block 306, the processor 204 may, responsive to the X velocity threshold being reached, determine if the cursor position is within the predetermined target zone. At block 308, the processor 204 may, responsive to the cursor position being within the predetermined target zone, start a countdown timer. At block 310, the processor 204 may detect a cursor stop within a set stop lock time period determined by the countdown timer. At block 312, the processor 204 may activate a dead zone and custom functions of the mouse. Note that the countdown timer may function as a count-up timer.

Figure 4:
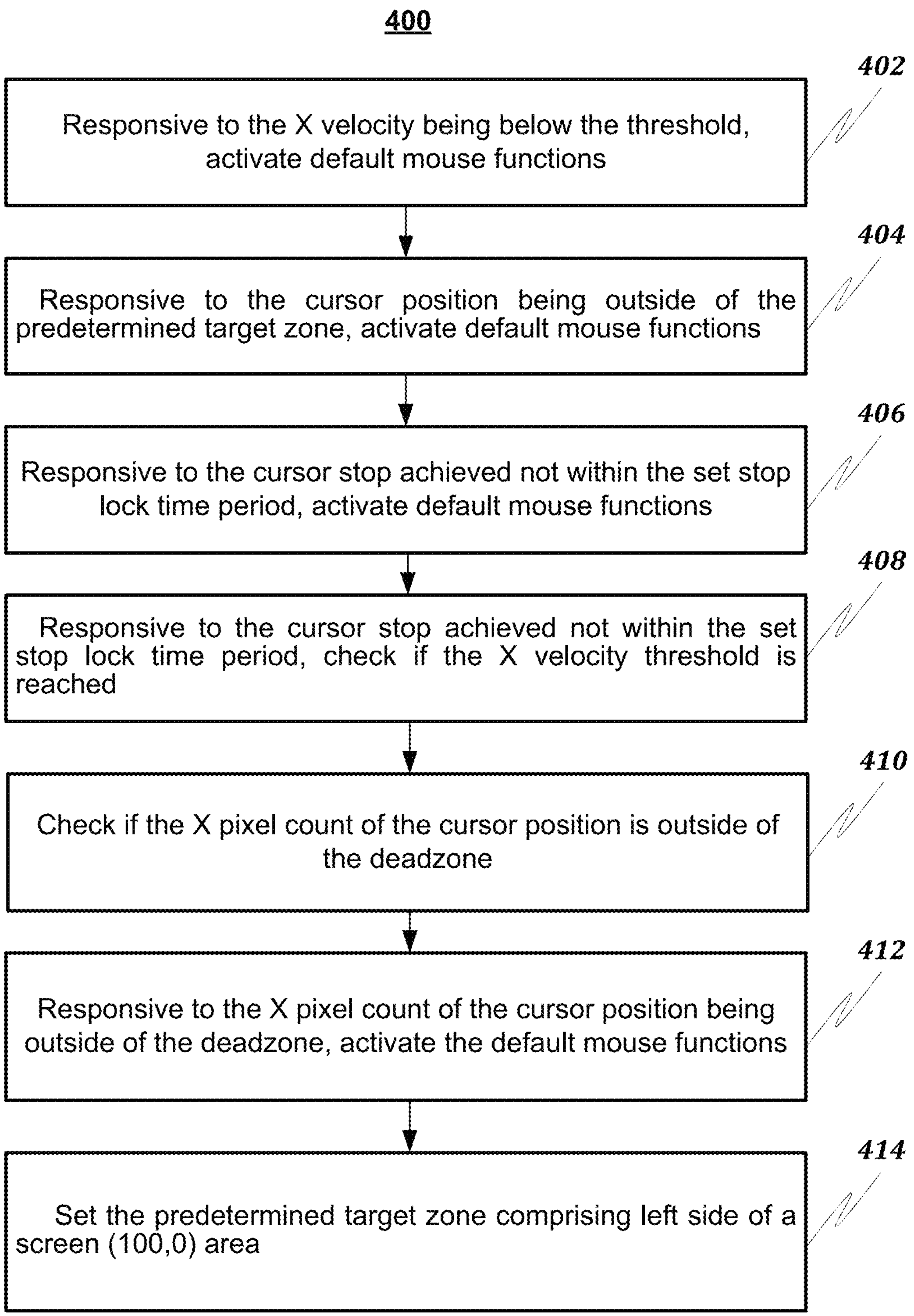
FIG. 4 illustrates a further flowchart of a method for real-time processing of computer mouse data and coordinated mouse movement consistent with the present disclosure.
Figure 5:
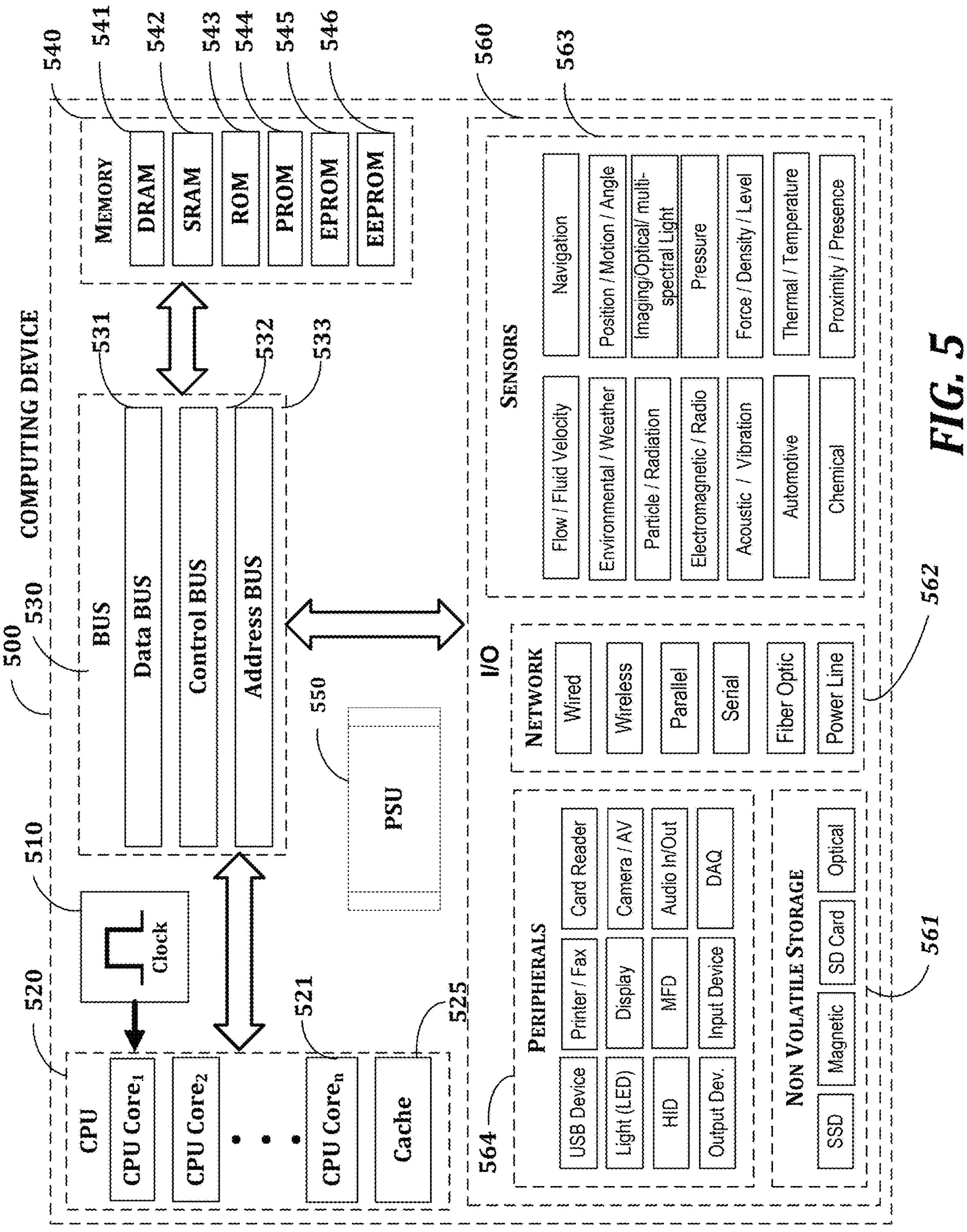
FIG. 5 illustrates a block diagram of a system including a computing device for performing the methods depicted in FIGS. 3 and 4.

FIG. 4 illustrates a further flowchart of a method for real-time processing of computer mouse data and coordinated mouse movement consistent with the present disclosure.

Referring to FIG. 4, the method 400 may include one or more of the steps described below. FIG. 4 illustrates a flow chart of an example method executed by the computer system 102 (see FIG. 2). It should be understood that method 400 depicted in FIG. 3 may include additional operations and that some of the operations described therein may be removed and/or modified without departing from the scope of the method 400. The description of the method 400 is also made with reference to the features depicted in FIG. 2 for purposes of illustration. Particularly, the processor 204 of the computer system node 102 may execute some or all of the operations included in the method 400.

With reference to FIG. 4, at block 402, the processor 204 may, responsive to the X velocity being below the threshold, activate default mouse functions. At block 404, the processor 204 may, responsive to the cursor position being outside of the predetermined target zone, activate default mouse functions. At block 406, the processor 204 may, responsive to the cursor stop achieved not within the set stop lock time period, activate default mouse functions. At block 408, the processor 204 may, responsive to the cursor stop achieved not within the set stop lock time period, check if the X velocity threshold is reached. At block 410, the processor 204 may check if the X pixel count of the cursor position is outside of the dead zone. At block 412, the processor 204 may, responsive to the X pixel count of the cursor position being outside of the dead zone, activate the default mouse functions.

At block 414, the processor 204 may set the predetermined target zone comprising the left side of a screen (100,0) area. The custom functions may include brightness adjustment and/or volume adjustment.

The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 4 illustrates an example computing device (e.g., a server node) 400, which may represent or be integrated in any of the above-described components, etc.

FIG. 4 illustrates a block diagram of a system including computing device 400. The computing device 400 may comprise, but not be limited to the following:

- Mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;
- A microcomputer, wherein the microcomputer computing device comprises, but is not limited to, a server, wherein a server may be rack mounted, a workstation, an industrial device, a raspberry pi, a desktop, or an embedded device;

The computer system node 102 (see FIG. 2) may be hosted on a centralized server or on a cloud computing service. Although method 300 has been described to be performed by the computer system node 102 implemented on a computing device 400, it should be understood that, in some embodiments, different operations may be performed by a plurality of the computing devices 400 in operative communication at least one network.

Embodiments of the present disclosure may comprise a computing device having a central processing unit (CPU) 420, a bus 430, a memory unit 440, a power supply unit (PSU) 440, and one or more Input/Output (I/O) units. The CPU 420 coupled to the memory unit 440 and the plurality of I/O units 460 via the bus 430, all of which are powered by the PSU 440. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 420, the bus 430, the memory unit 440, a PSU 440, and the plurality of I/O units 460 may be implemented in a computing device, such as computing device 400. Any suitable combination of hardware, software, or firmware may be used to implement the aforementioned units. For example, the CPU 420, the bus 430, and the memory unit 440 may be implemented with computing device 400 or any of other computing devices 400, in combination with computing device 400. The aforementioned system, device, and components are examples and other systems, devices, and components may comprise the aforementioned CPU 420, the bus 430, the memory unit 440, consistent with embodiments of the disclosure.

At least one computing device 400 may be embodied as any of the computing elements illustrated in all of the attached figures, including the Multi-Control-Plane Server 102 (FIG. 2). A computing device 400 does not need to be electronic, nor even have a CPU 420, nor bus 430, nor memory unit 440. The definition of the computing device 400 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 400, especially if the processing is purposeful.

With reference to FIG. 4, a system consistent with an embodiment of the disclosure may include a computing device, such as computing device 400. In a basic configuration, computing device 400 may include at least one clock module 410, at least one CPU 420, at least one bus 430, and at least one memory unit 440, at least one PSU 440, and at least one I/O 460 module, wherein I/O module may be comprised of, but not limited to a non-volatile storage sub-module 461, a communication sub-module 462, a sensors sub-module 463, and a peripherals sub-module 464.

A system consistent with an embodiment of the disclosure the computing device 400 may include the clock module 410 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 420, the central component of modern computers, which relies on a clock. The only exceptions are asynchronous circuits such as asynchronous CPUs. The clock 410 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 400 use a "clock multiplier" which multiplies a lower frequency external clock to the appropriate clock rate of the CPU 420. This allows the CPU 420 to operate at a much higher frequency than the rest of the computer, which affords performance gains in situations where the CPU 420 does not need to wait on an external factor (like memory 440 or input/output 460). Some embodiments of the clock 410 may include dynamic frequency change, where the time between clock edges can vary widely from one edge to the next and back again.

A system consistent with an embodiment of the disclosure the computing device 400 may include the CPU unit 420 comprising at least one CPU Core 421. A plurality of CPU cores 421 may comprise identical CPU cores 421, such as, but not limited to, homogeneous multi-core systems. It is also possible for the plurality of CPU cores 421 to comprise different CPU cores 421, such as, but not limited to, heterogeneous multi-core systems, big. LITTLE systems and some AMD accelerated processing units (APU). The CPU unit 420 reads and executes program instructions which may be used across many application domains, for example, but not limited to, general purpose computing, embedded computing, network computing, digital signal processing (DSP), and graphics processing (GPU). The CPU unit 420 may run multiple instructions on separate CPU cores 421 at the same time. The CPU unit 420 may be integrated into at least one of a single integrated circuit die and multiple dies in a single chip package. The single integrated circuit die and multiple dies in a single chip package may contain a plurality of other aspects of the computing device 400, for example, but not limited to, the clock 410, the CPU 420, the bus 430, the memory 440, and I/O 460.

The CPU unit 420 may contain cache 422 such as, but not limited to, a level 1 cache, level 2 cache, level 3 cache or combination thereof. The aforementioned cache 422 may or may not be shared amongst a plurality of CPU cores 421. The cache 422 sharing comprises at least one of message passing and inter-core communication methods may be used for the at least one CPU Core 421 to communicate with the cache 422. The inter-core communication methods may comprise, but not limited to, bus, ring, two-dimensional mesh, and crossbar. The aforementioned CPU unit 420 may employ symmetric multiprocessing (SMP) design.

The plurality of the aforementioned CPU cores 421 may comprise soft microprocessor cores on a single field programmable gate array (FPGA), such as semiconductor intellectual property cores (IP Core). The plurality of CPU cores 421 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 421, for example, but not limited to Instruction-level parallelism (ILP) such as, but not limited to, superscalar pipelining, and Thread-level parallelism (TLP).

Consistent with the embodiments of the present disclosure, the aforementioned computing device 400 may employ a communication system that transfers data between components inside the aforementioned computing device 400, and/or the plurality of computing devices 400. The aforementioned communication system will be known to a person having ordinary skill in the art as a bus 430. The bus 430 may embody internal and/or external plurality of hardware and software components, for example, but not limited to a wire, optical fiber, communication protocols, and any physical arrangement that provides the same logical function as a parallel electrical bus. The bus 430 may comprise at least one of, but not limited to a parallel bus, wherein the parallel bus carry data words in parallel on multiple wires, and a serial bus, wherein the serial bus carry data in bit-serial form. The bus 430 may embody a plurality of topologies, for example, but not limited to, a multidrop/electrical parallel topology, a daisy chain topology, and a connected by switched hubs, such as USB bus. The bus 430 may comprise a plurality of embodiments, for example, but not limited to:

- Internal data bus (data bus) 431/Memory bus
- Control bus 432
- Address bus 433
- System Management Bus (SMBus)
- Front-Side-Bus (FSB)
- External Bus Interface (EBI)
- Local bus
- Expansion bus
- Lightning bus
- Controller Area Network (CAN bus)
- Camera Link
- ExpressCard
- Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
- Small Computer system Interface (SCSI)/Serial Attached SCSI (SAS)
- HyperTransport
- InfiniBand
- RapidIO
- Mobile Industry Processor Interface (MIPI)
- Coherent Processor Interface (CAPI)
- Plug-n-play
- 1-Wire
- Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and extensible Host Controller Interface (xHCI).

Consistent with the embodiments of the present disclosure, the aforementioned computing device 400 may employ hardware integrated circuits that store information for immediate use in the computing device 400, known to the person having ordinary skill in the art as primary storage or memory 440. The memory 440 operates at high speed, distinguishing it from the non-volatile storage sub-module 461, which may be referred to as secondary or tertiary storage, which provides slow-to-access information but offers higher capacities at lower cost. The contents contained in memory 440, may be transferred to secondary storage via techniques such as, but not limited to, virtual memory and swap. The memory 440 may be associated with addressable semiconductor memory, such as integrated circuits consisting of silicon-based transistors, used for example as primary storage but also other purposes in the computing device 400. The memory 440 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 441, Static Random-Access Memory (SRAM) 442, CPU Cache memory 424, Advanced Random-Access Memory (A-RAM), and other types of primary storage such as Random-Access Memory (RAM).

Non-volatile memory which can retain stored information even after power is removed, for example, but not limited to, Read-Only Memory (ROM) 443, Programmable ROM (PROM) 444, Erasable PROM (EPROM) 444, Electrically Erasable PROM (EEPROM) 446 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 400 may employ the communication system between an information processing system, such as the computing device 400, and the outside world, for example, but not limited to, human, environment, and another computing device 400. The aforementioned communication system will be known to a person having ordinary skill in the art as I/O 460. The I/O module 460 regulates a plurality of inputs and outputs with regard to the computing device 400, wherein the inputs are a plurality of signals and data received by the computing device 400, and the outputs are the plurality of signals and data sent from the computing device 400. The I/O module 460 interfaces a plurality of hardware, such as, but not limited to, non-volatile storage 461, communication devices 462, sensors 463, and peripherals 464. The plurality of hardware is used by at least one of, but not limited to, human, environment, and another computing device 400 to communicate with the present computing device 400. The I/O module 460 may comprise a plurality of forms, for example, but not limited to channel I/O, port mapped I/O, asynchronous I/O, and Direct Memory Access (DMA).

Consistent with the embodiments of the present disclosure, the aforementioned computing device 400 may employ the non-volatile storage sub-module 461, which may be referred to by a person having ordinary skill in the art as one of secondary storage, external memory, tertiary storage, off-line storage, and auxiliary storage. The non-volatile storage sub-module 461 may not be accessed directly by the CPU 420 without using an intermediate area in the memory 440. The non-volatile storage sub-module 461 does not lose data when power is removed and may be two orders of magnitude less costly than storage used in memory modules, at the expense of speed and latency. The non-volatile storage sub-module 461 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (461) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 400 may employ the communication sub-module 462 as a subset of the I/O 460, which may be referred to by a person having ordinary skill in the art as at least one of, but not limited to, computer network, data network, and network. The network allows computing devices 400 to exchange data using connections, which may be known to a person having ordinary skill in the art as data links, between network nodes. The nodes comprise network computer devices 400 that originate, route, and terminate data. The nodes are identified by network addresses and can include a plurality of hosts consistent with the embodiments of a computing device 400. The aforementioned embodiments include, but not limited to personal computers, phones, servers, drones, and networking devices such as, but not limited to, hubs, switches, routers, modems, and firewalls.

Two nodes can be networked together, when one computing device 400 is able to exchange information with the other computing device 400, whether or not they have a direct connection with each other. The communication sub-module 462 supports a plurality of applications and services, such as, but not limited to World Wide Web (WWW), digital video and audio, shared use of application and storage computing devices 400, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 462 may comprise a plurality of size, topology, traffic control mechanism and organizational intent. The communication sub-module 462 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G, 4G (such as WiMax and LTE), and 4G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line and wireless communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 400 may employ the sensors sub-module 463 as a subset of the I/O 460. The sensors sub-module 463 comprises at least one of the devices, modules, and subsystems whose purpose is to detect events or changes in its environment and send the information to the computing device 400. Sensors are sensitive to the measured property, are not sensitive to any property not measured, but may be encountered in its application, and do not significantly influence the measured property. The sensors sub-module 463 may comprise a plurality of digital devices and analog devices, wherein if an analog device is used, an Analog to Digital (A-to-D) converter must be employed to interface the said device with the computing device 400. The sensors may be subject to a plurality of deviations that limit sensor accuracy. The sensors sub-module 463 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, position/angle/displacement/distance/speed/acceleration sensors, sensors, navigation imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (02), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 400 may employ the peripherals sub-module 462 as a subset of the I/O 460. The peripheral sub-module 464 comprises ancillary devices used to put information into and get information out of the computing device 400. There are 3 categories of devices comprising the peripheral sub-module 464, which exist based on their relationship with the computing device 400, input devices, output devices, and input/output devices. Input devices send at least one of data and instructions to the computing device 400. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 400. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 464:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 400. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 400 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 400. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 462 sub-module), data storage device (non-volatile storage 461), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A system for coordinated real-time processing of mouse data, comprising:

a processor of a computer system node connected to a mouse; and a memory on which are stored machine-readable instructions that when executed by the processor, cause the processor to:

monitor X pixel count of a cursor position and apply predetermined target zone comprising X coordinate range;

determine if an X velocity threshold is reached;

responsive to the X velocity threshold being reached, determine if the cursor position is within the predetermined target zone; and responsive to the cursor position being within the predetermined target zone, start a countdown timer, detect a cursor stop within a set stop lock time period determined by the countdown timer, and activate a dead zone and custom functions of the mouse.

2. The system of claim 1, wherein the custom functions comprise any of: brightness adjustment; and volume adjustment.

3. The system of claim 1, wherein the instructions further cause the processor to, responsive to the X velocity being below the threshold, activate default mouse functions.

4. The system of claim 1, wherein the instructions further cause the processor to, responsive to the cursor position being outside of the predetermined target zone, activate default mouse functions.

5. The system of claim 1, wherein the instructions further cause the processor to, responsive to the cursor stop achieved not within the set stop lock time period, activate default mouse functions.

6. The system of claim 5, wherein the instructions further cause the processor to, responsive to the cursor stop achieved not within the set stop lock time period, check if the X velocity threshold is reached.

7. The system of claim 1, wherein the instructions further cause the processor to check if the X pixel count of the cursor position is outside of the dead zone.

8. The system of claim 7, wherein the instructions further cause the processor to, responsive to the X pixel count of the cursor position being outside of the dead zone, activate the default mouse functions.

9. The system of claim 1, wherein the instructions further cause the processor to set the predetermined target zone comprising a left side of a screen (100,0) area.

10. A method for coordinated real-time processing of mouse data, comprising:

monitoring, by a computer system connected to a mouse, X pixel count of a cursor position and applying predetermined target zone comprising X coordinate range;

determining, by the computer system, if an X velocity threshold is reached;

responsive to the X velocity threshold being reached, determining, by the computer system, if the cursor position is within the predetermined target zone; and responsive to the cursor position being within the predetermined target zone, starting, by the computer system, a countdown timer, detecting, by the computer system, a cursor stop within a set stop lock time period determined by the countdown timer, and activating, by the computer system, a dead zone and custom functions of the mouse.

11. The method of claim 10, further comprising, responsive to the X velocity being below the threshold, activating default mouse functions.

12. The method of claim 10, further comprising, responsive to the cursor position being outside of the predetermined target zone, activating default mouse functions.

13. The method of claim 12, further comprising, responsive to the cursor stop achieved not within the set stop lock time period, activating default mouse functions.

14. The method of claim 10, further comprising checking if the X pixel count of the cursor position is outside of the dead zone.

15. The method of claim 14, further comprising, responsive to the X pixel count of the cursor position being outside of the dead zone, activating the default mouse functions.

16. The method of claim 10, further comprising setting the predetermined target zone comprising a left side of a screen (100,0) area.

17. A non-transitory computer-readable medium comprising instructions, that when read by a processor, cause the processor to perform:

monitoring X pixel count of a cursor position and applying predetermined target zone comprising X coordinate range;

determining if an X velocity threshold is reached;

responsive to the X velocity threshold being reached, determining if the cursor position is within the predetermined target zone; and responsive to the cursor position being within the predetermined target zone, starting a countdown timer, detecting a cursor stop within a set stop lock time period determined by the countdown timer, and activating a dead zone and custom functions of the mouse.

18. The non-transitory computer-readable medium of claim 17 comprising instructions, that when read by a processor, cause the processor to, responsive to the X velocity being below the threshold, activate default mouse functions.

19. The non-transitory computer-readable medium of claim 17 comprising instructions, that when read by a processor, cause the processor to, responsive to the cursor position being outside of the predetermined target zone, activate default mouse functions.

20. The non-transitory computer-readable medium of claim 19 comprising instructions, that when read by a processor, cause the processor to, responsive to the cursor stop achieved not within the set stop lock time period, activate the default mouse functions.

* * * * *